United States Patent
Araki et al.

(10) Patent No.: US 9,412,397 B1
(45) Date of Patent: Aug. 9, 2016

(54) METHOD OF FORMING A MAGNETIC WRITE HEAD

(71) Applicant: Headway Technologies, Inc., Milpitas, CA (US)

(72) Inventors: Hironori Araki, Santa Clara, CA (US); Yoshitaka Sasaki, Los Gatos, CA (US); Hiroyuki Ito, Sunnyvale, CA (US); Seiichiro Tomita, Milpitas, CA (US); Kazuki Sato, Sunnyvale, CA (US); Hideo Mamiya, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/608,586

(22) Filed: Jan. 29, 2015

(51) Int. Cl.
*G11B 5/127* (2006.01)
*H04R 31/00* (2006.01)
*G11B 5/17* (2006.01)
*G11B 5/00* (2006.01)

(52) U.S. Cl.
CPC ............. *G11B 5/17* (2013.01); *G11B 5/1272* (2013.01); *G11B 2005/0021* (2013.01)

(58) Field of Classification Search
CPC ...... G11B 5/1276; G11B 5/1278; G11B 5/17; G11B 5/315; G11B 5/3153; G11B 5/3163; G11B 5/39; G11B 5/855; Y10T 29/49043; Y10T 29/49046; Y10T 29/49048; Y10T 29/49052; Y10T 29/49055; Y10T 29/49071; Y10T 29/49073
USPC ............... 29/603.11, 603.13–603.16, 603.18, 29/605, 606; 360/123.03, 123.06, 123.1, 360/125.02, 125.16, 125.17, 125.3; 216/22, 216/39, 41, 48, 65
See application file for complete search history.

(56) References Cited

U.S. PATENT DOCUMENTS

| | | | | |
|---|---|---|---|---|
| 4,933,209 | A * | 6/1990 | Anthony | G11B 5/3163 29/603.14 |
| 6,441,994 | B1 * | 8/2002 | Wang | G11B 5/1278 360/123.39 |
| 6,696,226 | B1 * | 2/2004 | Dinan | G11B 5/3116 29/603.07 |
| 7,117,583 | B2 | 10/2006 | Dinan et al. | |
| 7,272,883 | B2 * | 9/2007 | Le | G11B 5/127 216/62 |
| 7,275,306 | B2 * | 10/2007 | Allen | B82Y 10/00 216/62 |
| 7,313,858 | B2 | 1/2008 | Hsiao et al. | |
| 2006/0065620 | A1 | 3/2006 | Lee et al. | |

* cited by examiner

*Primary Examiner* — Paul D Kim
(74) *Attorney, Agent, or Firm* — Saile Ackerman LLC; Stephen B. Ackerman (57) ABSTRACT

A magnetic write head has a plated coil with narrow pitch and is suitable for writing at high frequencies on magnetic media with high coercivity. The narrow pitch is obtained without such disadvantages as overplating that has adversely affected prior art attempts to produce such narrow pitches. The process that produces the magnetic write head is characterized by an RIE plasma etch using $O_2/N_2$ to etch plating trenches into a baked layer of photoresist with the ratio of gases being 5/45 sccm so that a dilute $O_2$ concentration does not create unwanted side etching of the plating trenches. In addition, a Cu seed layer is coated with an insulating layer of $Al_2O_3$ which redeposits on the trench sidewalls to inhibit redeposition of any Cu from the seed layer and prevent outward growth of the plated Cu that would result in overplating.

9 Claims, 6 Drawing Sheets

METHOD OF FORMING A MAGNETIC WRITE HEAD

BACKGROUND

1. Technical Field

This disclosure relates to magnetic write heads that write on magnetic recording media, particularly to the fabrication of their magnetic coils that create the magnetic fields for writing.

2. Description

As hard disk drives have been increasing the recording density of the magnetic disks on which data storage occurs, the thin-film magnetic heads used to write and read that data have been required to improve their performance as well. The thin-film read/write heads most commonly in use are of a composite type, having a structure in which a magnetism detecting device, such as a magnetoresistive (MR) read sensor is used together with a magnetic recording device, such as an electromagnetic coil device. These two types of devices are laminated together and serve to read/write data signals, respectively, from/onto magnetic disks which are the magnetic recording media.

In general, a magnetic recording medium, on a microscopic level of composition, is a discontinuous body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, and thereby worsens the thermal stability. Though $K_U$ may be made greater at the same time as a measure against this problem, the increase in $K_U$ also increases the coercivity of the magnetic recording medium. However, the writing magnetic field intensity produced by a magnetic head is substantially determined by the saturated magnetic flux density of a soft magnetic material constituting a magnetic pole within the head. Therefore, there can be no writing if the coercivity exceeds a permissible value determined by the limit of writing magnetic field intensity.

One method proposed for solving such a problem affecting the thermal stability of magnetization is the so-called thermally assisted magnetic recording (TAMR) scheme. In this approach, heat is applied to a magnetic recording medium immediately before applying a writing magnetic field, particularly while using a magnetic material having a large value of $K_U$. The heat then effectively lowers the medium's coercivity at the same position where the magnetic writing field is applied, so as to enable writing as though it were on a medium with lowered coercivity.

This scheme is roughly classified into magnetic dominant recording and optical dominant recording, depending on the relative effects of the magnetic field and the optical heating. In magnetic dominant recording, the writing is attributed to the localized effects of the electromagnetic coil device, while the radiation diameter of the incident light is greater than the track width (recording width). In optical dominant recording, by contrast, the writing is attributed to the light-radiating effect, as the radiation diameter of the incident light is substantially the same as the track width (recording width). Thus, the terms "magnetic dominant recording" and "optical dominant recording" impart the effects of spatial resolution to a magnetic field or a radiation field, respectively.

In the thermally assisted magnetic head recording apparatus, a light source such as a semiconductor laser is typically suggested as the source of thermal energy. Light from a light-emitting device is introduced into an optical waveguide. As waveguide material, TaOx or SiON is proposed. The waveguide is surrounded with cladding material, typically $Al_2O_3$, SiON or SiO2. The light is focused by a plasmon generator at the distal end of the waveguide, which is usually made of highly conductive material such as Au or Ag. There are many kinds of plasmon generators. The light focused at the plasmon generator is emitted, as plasmon energy, from a light exit and heats the surface of recording media.

As indicated above, thermally assisted magnetic head recording is a new technology for use in a future (HDD) hard disk drive head to achieve higher recording density. To maximize the effectiveness of this technology, the frequency extendibility (range) of the HDD head needs to be improved at the same time. The most effective method to improve frequency extendibility is to shorten the magnetic path of the recording flux. One way to do this is to make a smaller pitch coil.

The prior arts teach several methods to address the problems of improving coil structure and performance. Hsiao et al. (U.S. Pat. No. 7,313,858), Lee et al. (US Publ. Pat. Appl. 2006/0065620) and Dinan et al. (U.S. Pat. No. 7,117,583) all address issues of coil structure, but none provide a method to produce the desirable effects of the present disclosure.

SUMMARY

The first object of this disclosure is to fabricate a write head with a coil that has a smaller pitch and to thereby increase the writing frequency of the write head.

A second object of this disclosure is to provide such a smaller pitch coil by the use of a photoresist etching method that eliminates problems found in conventional prior art processes that limit the desired pitch reduction.

Figure 6:
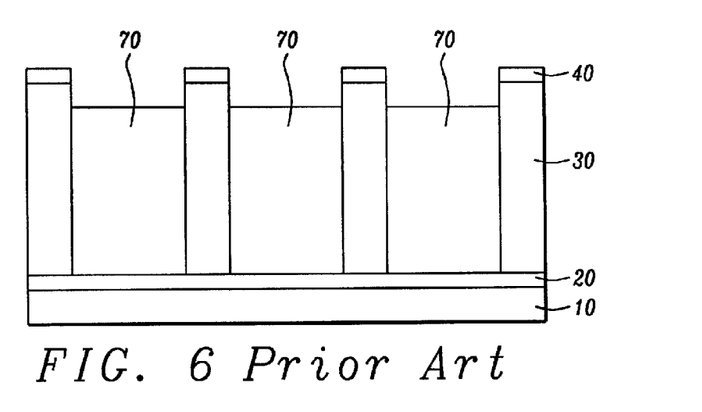
FIG. 6 is a schematic representation of the final step in the prior art process begun in FIG. 3.

These objects will be achieved by a photoresist etching method that prevents overplating of the coil material that then fills the spaces (trenches) between the coil pattern (see FIG. 6 for the effects of overplating). The elimination of overplating allows the coil layers to be more narrowly spaced (smaller pitch) than is presently the case using standard methods of patterning and plating.

The advantages of the present method can best be seen and understood by a brief analysis of the process flow of prior art methods, two of which will now be discussed:

a) photoresistive plating; and
b) conventional photoresist RIE (reactive ion etching).

Not all the steps will be shown and described here, since it is aspects of the final results only that are needed for comparison purposes.

Figure 1:
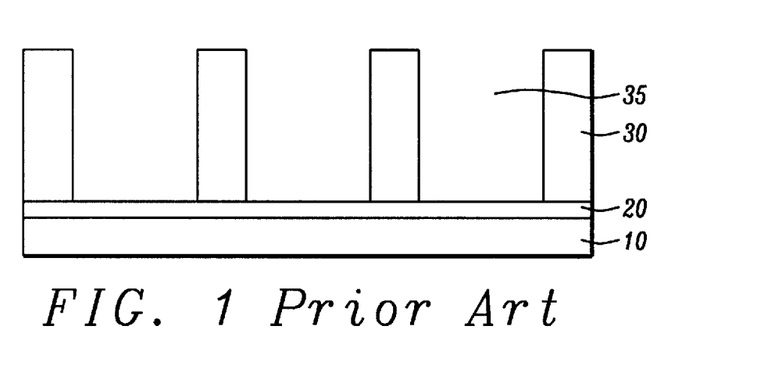
FIG. 1 is a schematic representation of an initial step in a prior art photolithographic process to plate Cu coils within a patterned photoresist.

Referring first to schematic FIG. 1, there is shown a side view of a fabrication that is ready for a plating of the exemplary Cu magnetic coils according to prior art process a). Bottom layer 10 is an underlayer typically formed of $Al_2O_3$. A seed layer 20 of Cu has been formed on the underlayer. The Cu seed layer will be the basis for the plating of the coils, which will also be Cu, but other conductive plated materials are also acceptable.

Continuing with FIG. 1, a thick layer of photoresist has been formed on the seed layer and then patterned to leave open trenches 35 bordered by the vertical remaining patterned pieces 30 of the photoresist. Note we will use the term "photoresist" to refer generally to photoresistive material commonly used in photolithography to create patterns for thin-film fabrications.

Figure 2:
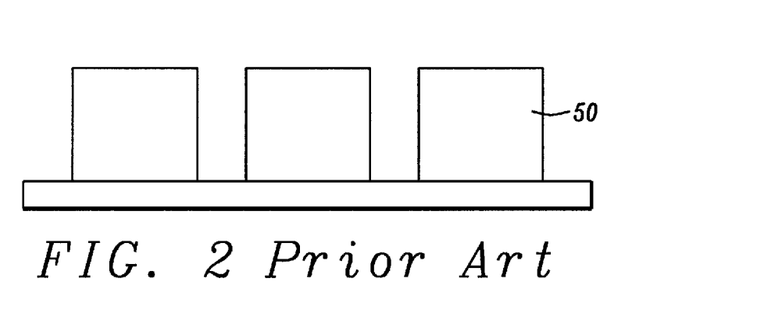
FIG. 2 is a schematic representation showing the coils produced using the prior art process of FIG. 1.

Referring to schematic FIG. 2, there is shown the results 50 of plating Cu into the trenches (35 in FIG. 1), followed by removal of the photoresist pattern pieces (30 in FIG. 1) and the stripping of the Cu seed layer (20 in FIG. 1) from beneath the now removed pattern pieces of photoresist. The plated Cu coil pieces 50 have a minimum pitch of approximately 1.2μ (microns), which is a minimum amount dictated by the nature of the photoresist patterning process (e.g., effects due to thick photoresist layers). It is virtually impossible to fabricate a much narrower pitch coil using this method. Because the coil "thickness" (the height of the coil) is greater than 1μ, the photoresist thickness must be greater than 2μ. The thick photoresist layer limits the narrowest coil pitch to be approximately 2μ.

Figure 3:
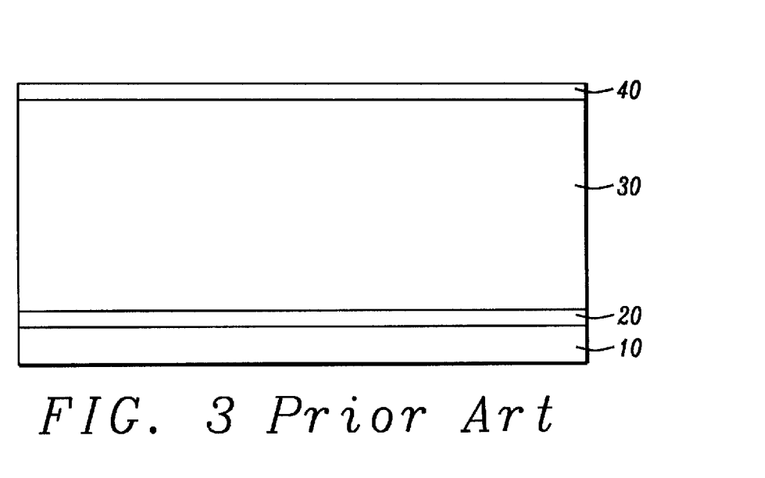
FIG. 3 is a schematic representation of the initial formation leading to a conventional, prior art coil plating process using an RIE etching of a photoresist pattern.

Referring now to schematic FIG. 3, there is shown an initial fabrication structure of prior art method b), which is a conventional coil plating process with RIE (reactive ion etch) patterning of photoresist. This process will be shown in somewhat greater detail than that of the process a).

A Cu seed layer 20 is deposited on an $Al_2O_3$ underlayer 10, the Cu seed layer being between approximately 500 A and 1000 A (angstroms) in thickness. A layer of photoresist 30 is deposited over the seed layer to a thickness between approximately 2μ to 3.5μ. The photoresist is then typically baked at between approximately 125° (degrees) and 180° C. (Celsius). The bake produces a self-planarization (reduction of surface height variations), so the upper surface of the resist layer is rendered smooth. Surface height variations of the photoresist layer are reduced each time an additional baking process occurs. A series of further bakes between approximately 125 to 180 C reduce the photoresist 30 surface height variations to approximately 1400 A and produce a smooth upper surface. A hard mask layer of $Al_2O_3$ 40, to be used as a pattern for the photoresist layer 30, is then deposited on the baked photoresist to a thickness of approximately 1000 A.

Figure 4:
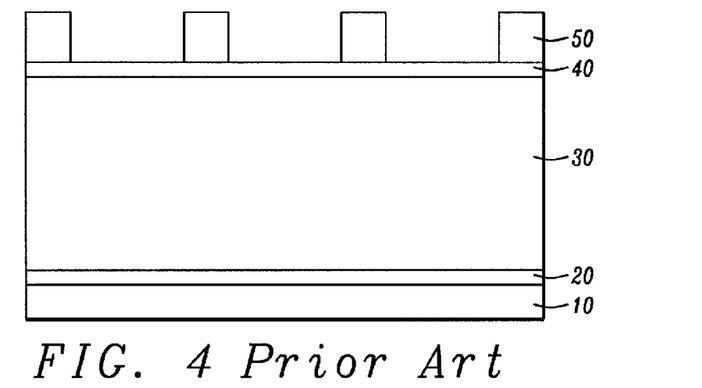
FIG. 4 is a schematic representation of the next step of the prior art process initiated in FIG. 3.

Next, referring to schematic FIG. 4, the hard photo-mask (simply, hard mask) 40 is about to be patterned using an already patterned photoresist layer 50 as shown (the patterning process of layer 50 is not shown). The hard mask 40 is a layer of $Al_2O_3$ formed to a thickness of approximately 1000 A. The patterned photoresist layer 50 is formed to a thickness of approximately 0.5μ over the hard mask to produce the patterning of the hard mask. It is noted that the photoresist mask 50 used to pattern the hard mask is made thinner than would normally be the case because it makes it easier to produce a narrower pattern and smaller pitch of approximately 0.6μ. A more conventional 2μ, to 3.5μ photoresist thickness would produce a pitch of more than 1.2μ.

Figure 5:
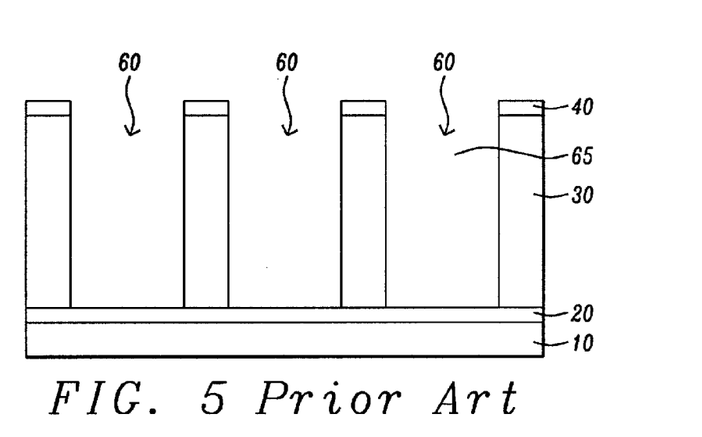
FIG. 5 is a schematic representation of yet a further step in the prior art process shown in FIG. 4.

Referring now to schematic FIG. 5, there is shown the resulting fabrication after the photoresist patterning and application of an RIE etching process (arrows, 60) using that patterning. Trenches 65 are etched through the hard mask layer 40 and the photoresist layer 30, stopping at the now exposed seed layer 20. These trenches will serve as the forms for plating the coil. The RIE etching process uses $Cl_2/BCl_3$ plasma to etch the openings in the $Al_2O_3$ hard mask 40 and then an $O_2$ based RIE plasma etch 60 is used to create the trenches 65. More specifically, the $O_2$ etch is an $O_2/N_2$ etch at a 5/45 sccm rate. It is to be noted that in RIE etching of photoresist the chemical etching may be too strong and cause the sides of the trenches to be etched. Therefore, the $O_2$ flow rate is chosen to dilute the $O_2$ component of the $O_2/N_2$ in order to prevent the unwanted side etching. Referring finally to schematic FIG. 6, there is shown the plating of Cu 70 into the trenches patterned in the photoresist.

Figure 7:
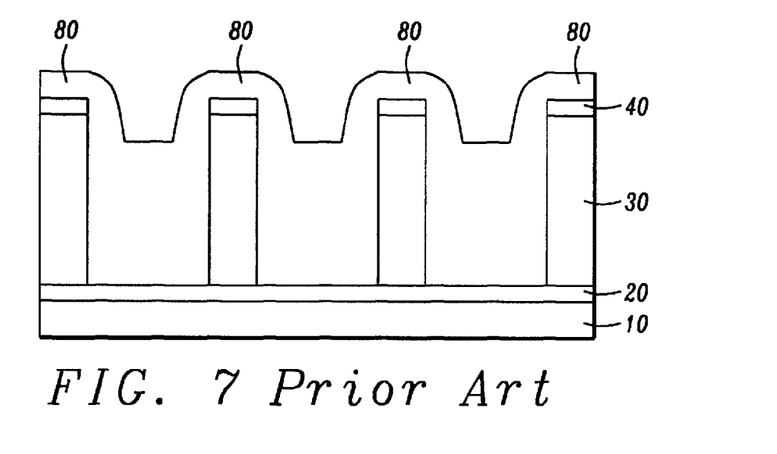
FIG. 7 is a schematic diagram showing the problem of overplating that results from application of the prior art process in FIGS. 3-6.

The conventional process described above with reference to FIGS. 3-6, produces normal plating within the trenches shown in FIG. 6, but if the trenches are wider, as shown in schematic FIG. 7, then there is a problem with overplating 80, where plated copper residue is redeposited over the tops of the trenches. This overplating results from the redeposition of the Cu from the sidewalls of the trenches 80. Ideally, the Cu plating should originate from the seed layer 20 only, so it is necessary to eliminate the sidewalls as an unwanted source of plating growth. It is to be noted that the etching rate to produce narrow trenches in the photoresist is low, so in order to get good etch quality, the wider trenches in the pattern will tend to become overetched. This leads to overplating around the wider trenches. It will be the process of the present disclosure to prevent this overplating.

Figure 8:
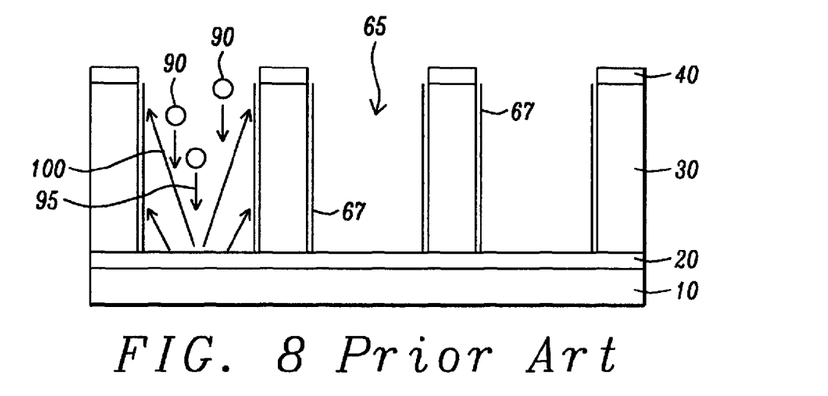
FIG. 8 is a schematic illustration showing in greater detail the causes of the overplating shown in FIG. 7 with particular attention shown to the role of redeposition of the seed layer on the sidewalls.

Referring now to schematic FIG. 8, there is shown a fabrication very much like that of FIG. 5, showing exemplary Cu atoms 90 being deposited by plating into a trench 65 and impinging (see heavy downward directed arrows 95) on the seed layer 20 lining the trench bottom. Arrows 100 directed upward towards the sidewalls of the trench boundaries represent Cu atoms leaving the seed layer and forming re-depositions 67 along the interior sidewalls of the trench. These re-deposited layers will contribute to the unwanted overplating shown in FIG. 7.

Figure 9:
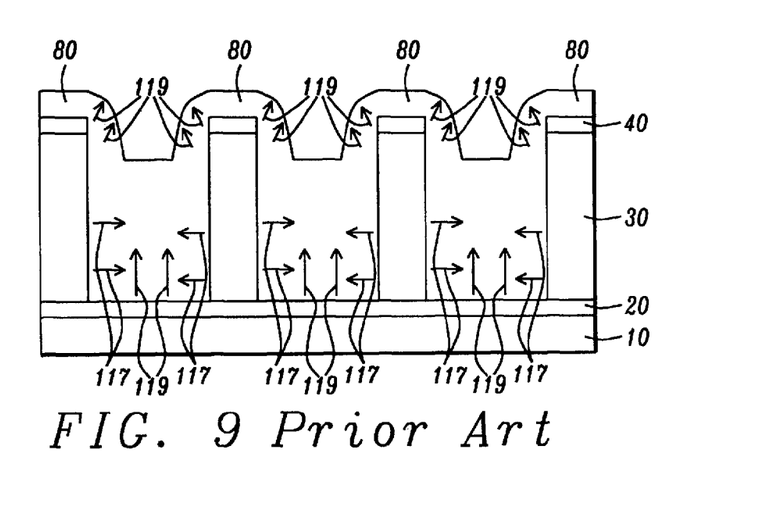
FIG. 9 is a schematic illustration showing the illustration of FIG. 8 with the trenches now filled with the plated material and the presence of overplating.

Referring next to FIG. 9, there is shown schematically the trenches now filled with the plated Cu material. Arrows upwardly drawn from the bottom seed layer 115 and inwardly drawn from the sidewalls 117 indicate how the trenches fill uniformly, but angled arrows 119 drawn from the sidewalls show the origin of the overplated regions 80.

Figure 10:
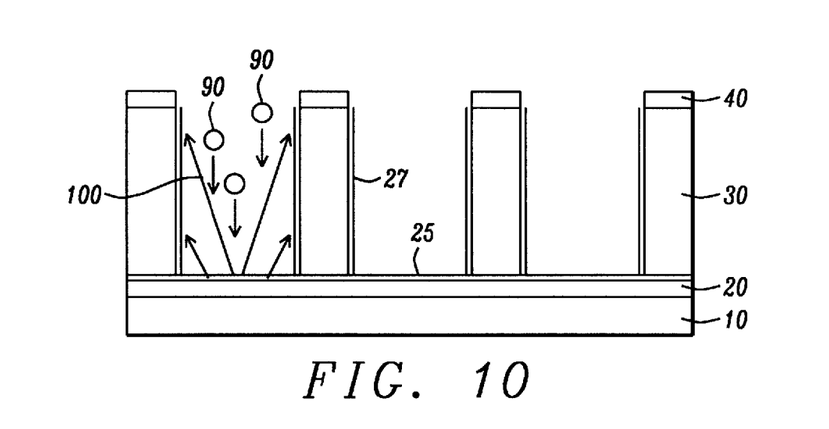
FIG. 10 is a schematic illustration analogous to that of FIG. 8 but with the presence of redeposited insulator protection on the sidewalls such as would result using the presently claimed method of this disclosure.

Referring now to FIG. 10, there is shown the beneficial effects of the presently claimed process (which will be described in greater detail below), which includes the formation of an additional thin, non-metallic, insulating "stopper" layer 25 on the seed layer 20. This additional, non-metallic layer covers the sidewalls by redeposition 27 during the RIE process that forms trenches in the photoresist. The insulating stopper layer, which here is a layer of $Al_2O_3$, prevents the growth of Cu outward from the sidewalls as shown in FIG. 8 because it blocks the redeposition of Cu from the seed layer onto the sidewalls where it would act as an additional (and unwanted) seed layer.

However, downward directed Cu (or other) plating atoms 90 do arrive at the seed layer 20 to produce a desirable plating effect. This occurs because just before the Cu plating, a wet etch can remove the redeposited layer of $Al_2O_3$ 27 from the trench sidewalls and also remove it from the seed layer 20.

It is important to note that the insulating $Al_2O_3$ does not act as a metallic (e.g. Cu) seed layer on the sidewalls and, moreover, it blocks any redeposition of the Cu which would act as a seed layer on the sidewalls. Furthermore, it is easily removed by a wet etch. However, if redeposited Cu covered the sidewalls (if they lacked the protective $Al_2O_3$), there would be plating growth outward from the sidewalls that would lead to the unwanted overplating of FIG. 9.

Figure 11:
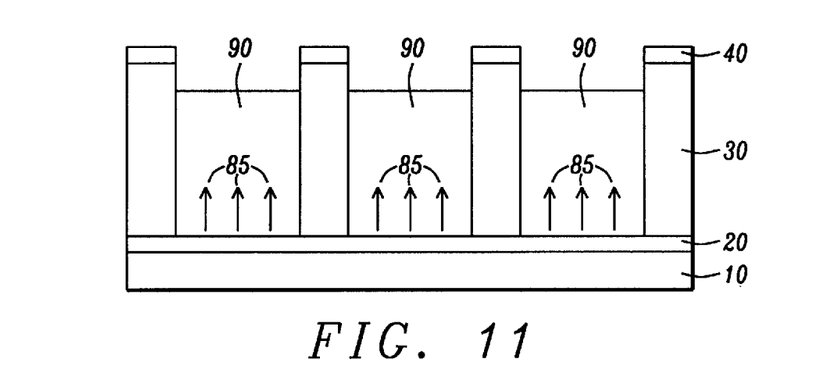
FIG. 11 is a schematic diagram showing the effects of the additional protection in FIG. 10 on the actual plated coil.

Referring to FIG. 11, there is shown the space between the trench sidewalls is now uniformly filled with plated material 90 that grows upward (arrows 85) from the seed layer. Any remnants of $Al_2O_3$ have been removed by a wet etch.

Figure 12:
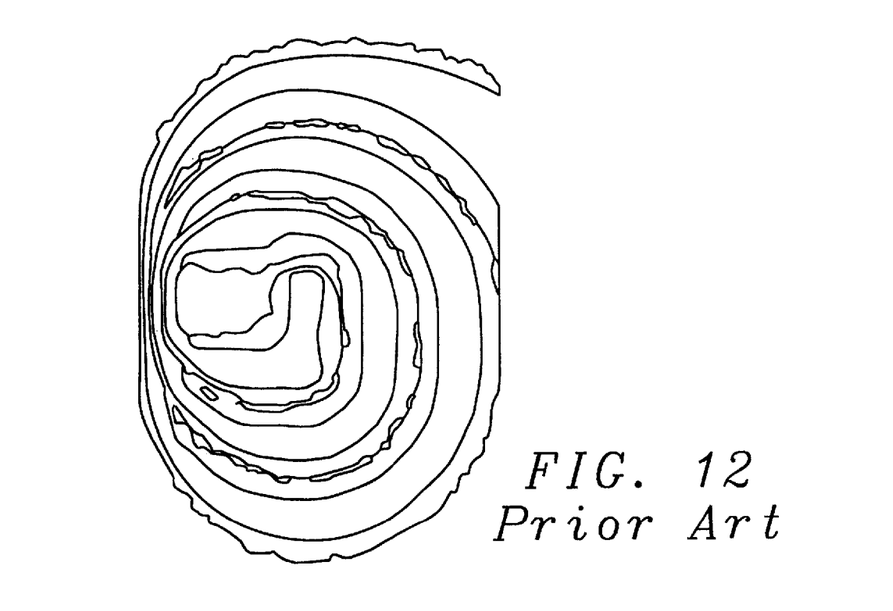
FIG. 12 is an illustration drawn from a microphotograph of a plated coil, taken from above, showing the appearance of overplating as might result from the effects of FIG. 9.

Referring to FIG. 12 there is shown a pictorial representation of an upper view photomicrograph illustrating a coil that has not been formed using the present method. There can be seen the adverse effects of overplating which prevent the forming of a narrow pitch.

Figure 13:
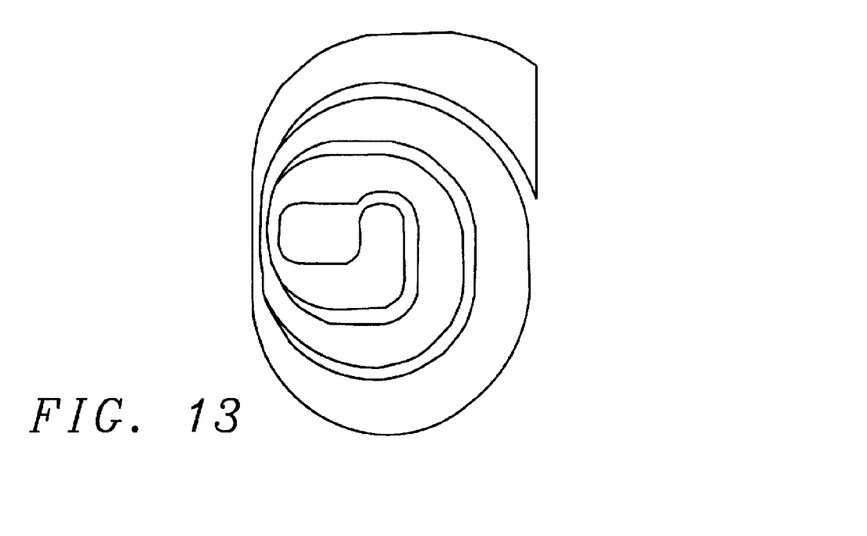
FIG. 13 is an illustration analogous to that in FIG. 12 showing the coil's appearance when the overplating is absent, as would be the result when using the presently claimed process.

Referring to FIG. 13, there is shown a pictorial representation of an upper view photomicrograph illustrating a narrow pitch coil that has been formed using the present method. In this illustration a 300 A insulating layer of $Al_2O_3$ has been applied over the seed layer. No overplating is observed.

DETAILED DESCRIPTION

We describe a process for fabricating a magnetic write head having a plated coil with a narrow pitch that is suitable for high frequency recording on magnetic media having high coercivity. We also describe the write head that is fabricated using that process. Such a write head is particularly appropriate for use in a TAMR scheme for recording on magnetic media having high coercivity.

Figure 14:
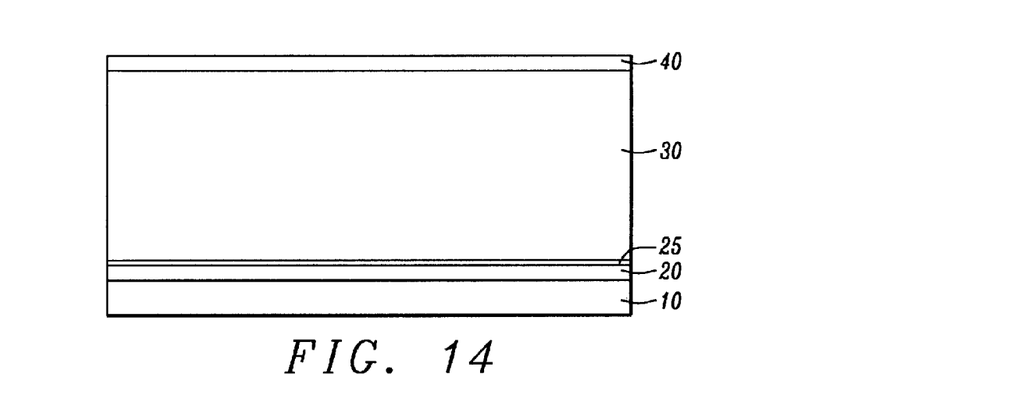
FIG. 14 is a schematic illustration of the first step in a process-flow that implements the presently claimed process.

Referring now to FIG. 14 there is shown schematically the first step in the present process-flow that will produce the narrow pitch plated write coil. The illustration shows, in vertically ascending order, an underlayer 10, preferably formed of $Al_2O_3$. On the underlayer there is formed a Cu seed layer 20 of thickness between approximately 500 and 1000 A. On the Cu seed layer is formed an insulating "stopper" layer 25, which in this example is a layer of between approximately 50 A and 400 A of $Al_2O_3$ whose purpose is both to protect the Cu seed layer from a subsequent RIE etching process through a photoresist layer that will next be formed on the stopper layer, and also to provide sidewall protection from the effects of redeposition of Cu from the plated Cu coils.

On the stopper layer 25 is then formed a layer of photoresistive material (i.e., photoresist) 30 to a thickness of between 2μ and 3.5μ. This photoresist layer is baked at approximately 180° C. The baking process has two purposes. First, it insures that the photoresist layer is not removed by a wet etch process that is used to remove the $Al_2O_3$ stopper layer 25 before coil plating. A bake temperature below approximately 150° C. is insufficient to produce a photoresist layer that will not also be removed by the wet etch. The second purpose of the bake is to provide self-planarization. The bake produces a flat upper surface of the photoresist. In our discussion of FIG. 3, above, we noted that a series of baking processes sequentially reduced surface height variations of the photoresist so that a subsequent hard mask layer (described below) could be advantageously formed on a smooth surface.

Finally, a hard mask layer 40 is formed by the deposition of approximately 1000 A of $Al_2O_3$ on the now planarized photoresist layer 30. This hard mask layer, which will itself be patterned by a photoresist layer in the following figure, will then be used to pattern layer 30 by a RIE.

Figure 15:
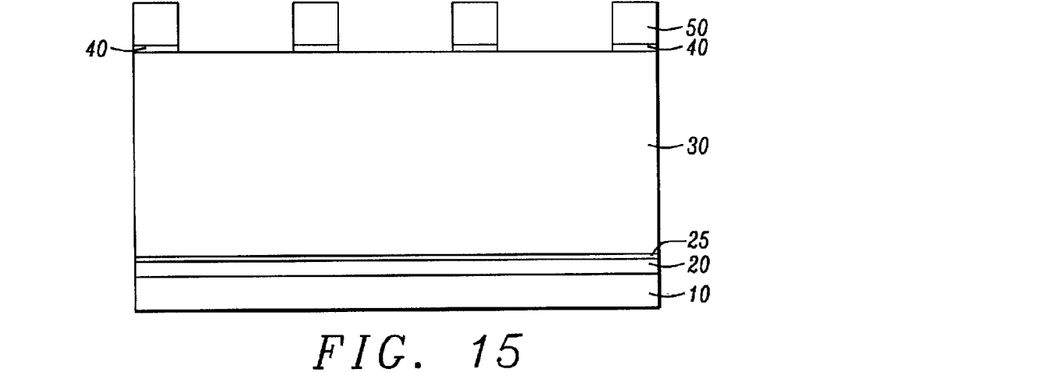
FIG. 15 is a schematic illustration of the second step in that process-flow.

Referring next to schematic FIG. 15 there is shown the results of a photoresist patterning 50 of the hard mask layer 40 that is formed by the deposition of approximately 1000 A of $Al_2O_3$ after the 180° C. bake. The patterning is done by the formation of a photoresist mask 50 on the $Al_2O_3$ and then patterning the photoresist mask while it is on the hard mask layer. In conventional photoresistive mask patterning, the thickness of the photoresist is between approximately 2μ and 3.5μ, because the thickness of the resist must be greater than the thickness of the plated coil; but in this process, the layer of resist 50 is only approximately 0.5μ because it is used for hard-mask patterning. This much thinner photoresist thickness is advantageous for the present photo process. The thinner resist is easier to use in making a narrow pattern.

Figure 16:
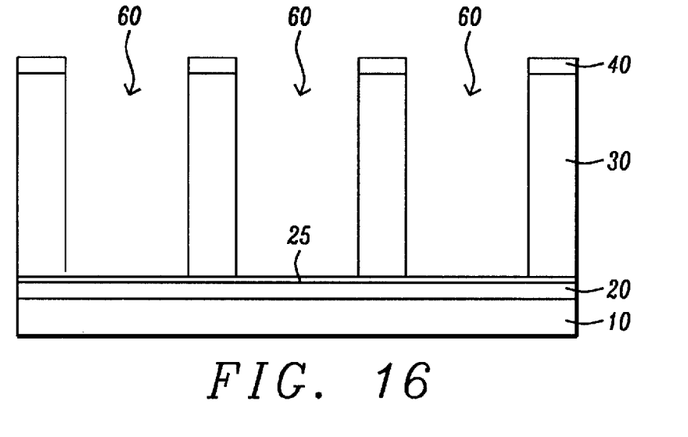
FIG. 16 is a schematic illustration of the third step in that process-flow.

Referring now to schematic FIG. 16, the photoresist pattern is used in conjunction with a $Cl_2/BCl_3$ plasma RIE to etch (wavy arrow 60) through the $Al_2O_3$ hard mask layer 40. Then the photoresist layer 30 beneath the hard mask layer is etched with an $O_2$ based plasma RIE, in which a gas mixture $O_2/N_2$ is fed at the rate of 5/45 sccm, with the $O_2$ component being dilute to avoid side etching of the trench sidewalls formed by the surfaces of the photoresist 30. During this process, the stop layer 25 partially re-deposits (see arrows 100 in FIG. 10) on the photoresist sidewalls that form the trenches for the coil plating process that follows. Note that redeposition of the stop layer of $Al_2O_3$, which is an insulator, on trench sidewalls will not adversely affect the subsequent plating process because it does not act as a seed layer for the plating material. However, if there is redeposition of Cu (or whatever conductor is being used for plating the coils) on trench sidewalls, the Cu will play the role of a seed layer there and plated Cu will grow out from the sidewalls as well as up from the bottom of the trench. Sidewall outgrowth will result in overplating and must be avoided. Any redeposition of $Al_2O_3$ on the resist sidewalls, moreover, can be removed by a wet etch process immediately prior to the plating of the Cu.

Figure 17:
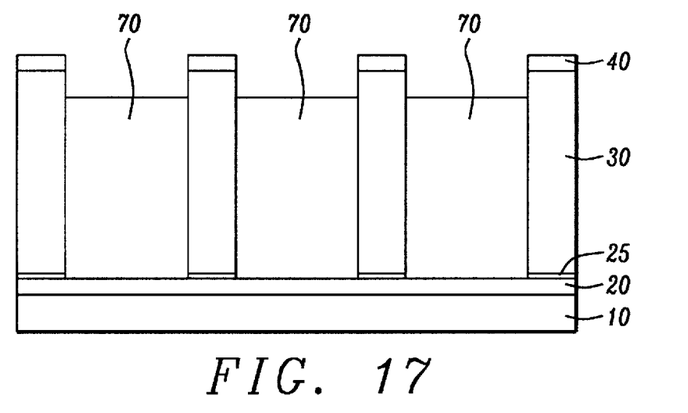
FIG. 17 is a schematic illustration of the fourth step in that process-flow.

Referring now to schematic FIG. 17, there is shown that the remaining $Al_2O_3$ stopper layer 25 has been removed from the seed layer 20 by wet etching and the Cu 70 is plated on the resulting exposed portions of the seed layer 20. This wet etching can also remove unwanted redepositions of the $Al_2O_3$ along the trench sidewalls.

Figure 18:
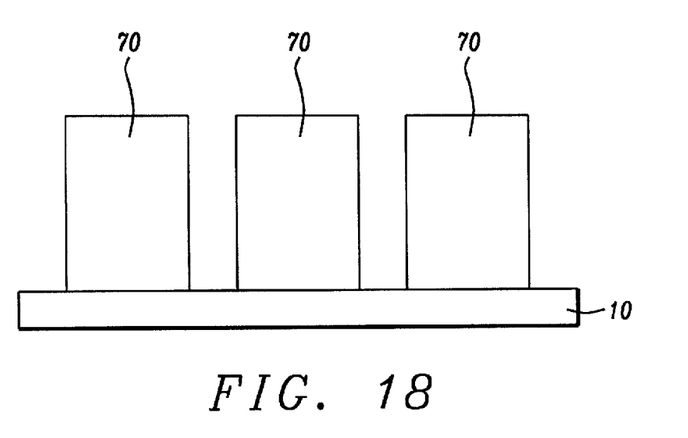
FIG. 18 is a schematic illustration of the fifth and final step in that process-flow, leading to a plated coil such as shown in FIG. 13.

Referring finally to schematic FIG. 18, there is shown only the plated coils 70 remaining after a wet etch to remove the remaining $Al_2O_3$ stopper layer (40 in FIG. 17), followed by a resist strip of the trench walls (30 in FIG. 17), followed then by a wet etch to remove the remaining stopper layer (25 in FIG. 17) beneath the trench walls and, finally, an ion-milling operation to remove remnants of the Cu seed layer (20 in FIG. 17) beneath the stopper layer (25 in FIG. 17). The resulting coil structure has a narrow 0.6μ pitch, which is the sum of the width of the coil piece and the space between adjacent pieces.

As is understood by a person skilled in the art, the present description is illustrative of the present disclosure rather than limiting of the present disclosure. Revisions and modifications may be made to methods, materials, structures and dimensions employed in forming and providing a magnetic write head having a plated coil of narrow pitch and, therefore, being suitable for high frequency recording on high coercivity magnetic media, while still forming and providing such a device and its method of formation in accord with the spirit and scope of the present disclosure as defined by the appended claims.

What is claimed is:

1. A method of forming a magnetic write head comprising:
   providing an underlayer;
   forming a seed layer on said underlayer;
   forming an insulating first stopper layer on said seed layer;
   forming a first photoresist layer on said first stopper layer;
   in a first patterning process, patterning said first photoresist layer to form a trench defining a plated coil formation, wherein said first patterning process eliminates the possibility of overplating; then
   plating a conducting coil in said trench, said plating being characterized by an absence of overplating; and then
   removing said patterned photoresist thereby leaving a narrow pitch conductive coil formation.

2. The method of claim 1 wherein said first patterning process further comprises:
   baking said first photoresist layer using a baking process to reduce surface height variations and planarize said surface; then
   depositing a hard mask material on said baked first photoresist layer; then
   forming a second layer of photoresist on said hard mask material; then
   performing a second patterning process on said second layer of photoresist; then
   using said second patterned second layer of photoresist, etching through said hard mask material using a $Cl_2$/$BCl_3$ plasma reactive ion etch (RIE); then
   using a $O_2$/$N_2$ plasma RIE, continuing an etch through said baked first photoresist layer to create plating trenches and expose said insulating stopper layer while also producing redeposition of said insulating stopper layer on said trench sidewalls; then
   removing said insulating stopper layer from said sidewalls and from said seed layer by using a wet etch, thereby exposing said seed layer on said underlayer and exposing sidewalls free from redepositions; then
   plating said conducting coil onto said seed layer; then
   removing remaining trench boundaries formed by said first photoresist; and
   removing remaining exposed pieces of said seed layer.

3. The method of claim 2 wherein said $O_2$/$N_2$ plasma RIE etch uses a dilute concentration of $O_2$ to minimize side etching of said trenches formed in said first layer of photoresist.

4. The method of claim 3 wherein said $O_2$/$N_2$ plasma RIE etch applies the respective gases at the rate of 5/45 sccm.

5. The method of claim 2 wherein said baking process of said first layer of photoresist is at a temperature of approximately 180° C.

6. The method of claim 2 wherein said baking process of said first layer of photoresist is at a series of temperatures ranging from 125° C. to approximately 180° C.

7. The method of claim 1 wherein said insulating stopper layer is a layer of $Al_2O_3$ formed to a thickness of between approximately 50 A and 400 A.

8. The method of claim 1 wherein said seed layer is a layer of Cu formed to a thickness of between approximately 500 A and 1000 A.

9. The method of claim 1 further comprising the formation of a magnetic write pole capable of being energized by said narrow coil formation, wherein said magnetic write pole is characterized by a short flux path and is thereby capable of producing high frequency writing when energized.

\* \* \* \* \*